United States Patent
Renshaw

(10) Patent No.: US 7,353,732 B2
(45) Date of Patent: Apr. 8, 2008

(54) CROSSBRACE CLAMP ASSEMBLY

(75) Inventor: Andrew Charles Renshaw, Macclesfield (GB)

(73) Assignee: Renthal Limited, Stockport (GB)

( * ) Notice: Subject to any disclaimer, the term of this patent is extended or adjusted under 35 U.S.C. 154(b) by 545 days.

(21) Appl. No.: 10/688,919

(22) Filed: Oct. 21, 2003

(65) Prior Publication Data
US 2004/0093978 A1 May 20, 2004

(30) Foreign Application Priority Data
Nov. 14, 2002 (GB) .................................. 0226540.3

(51) Int. Cl.
*B62K 21/12* (2006.01)
(52) U.S. Cl. ..................................... 74/551.8
(58) Field of Classification Search ................ 403/388, 403/398, 289, 290; 74/551.8, 551.1
See application file for complete search history.

(56) References Cited

U.S. PATENT DOCUMENTS

| | | | | |
|---|---|---|---|---|
| 892,105 A | * | 6/1908 | White | 248/60 |
| 4,700,919 A | * | 10/1987 | Saunders, IV | 248/288.31 |
| 4,802,751 A | * | 2/1989 | Ueng | 359/865 |
| 5,064,157 A | * | 11/1991 | O'Neal | 248/230.1 |
| 5,117,708 A | | 6/1992 | Boyer et al. | |
| 5,257,552 A | | 11/1993 | Boyer et al. | |
| 5,950,497 A | | 9/1999 | Weiher | |
| 6,182,528 B1 | | 2/2001 | Renshaw | |
| 2005/0198781 A1 | * | 9/2005 | Mangano et al. | 16/421 |

FOREIGN PATENT DOCUMENTS

GB   A 2 321 225 A   7/1998
WO   WO 00/21824 A1   4/2000

* cited by examiner

*Primary Examiner*—Charles A. Marmor
*Assistant Examiner*—Derek D. Knight
(74) *Attorney, Agent, or Firm*—Oliff & Berridge, PLC

(57) ABSTRACT

A crossbrace, for fitting between intermediate bent sections of a motorcycle handlebar, is formed at its respective ends with a part spherical knob. It is then clamped to the bar, by way of these knobs, by two clamp portions at each end. Each clamp portion has a part spherical recess and the knob is received and clamped between these recesses. Each clamp portion also has a recess of part-circular section and the bar is received and clamped between these recesses. Each clamp portion also has one or preferably two apertures for the fasteners, such as bolts and nuts for effecting their attachment in facing and clamping disposition around the bar and the knob of the crossbrace.

3 Claims, 2 Drawing Sheets

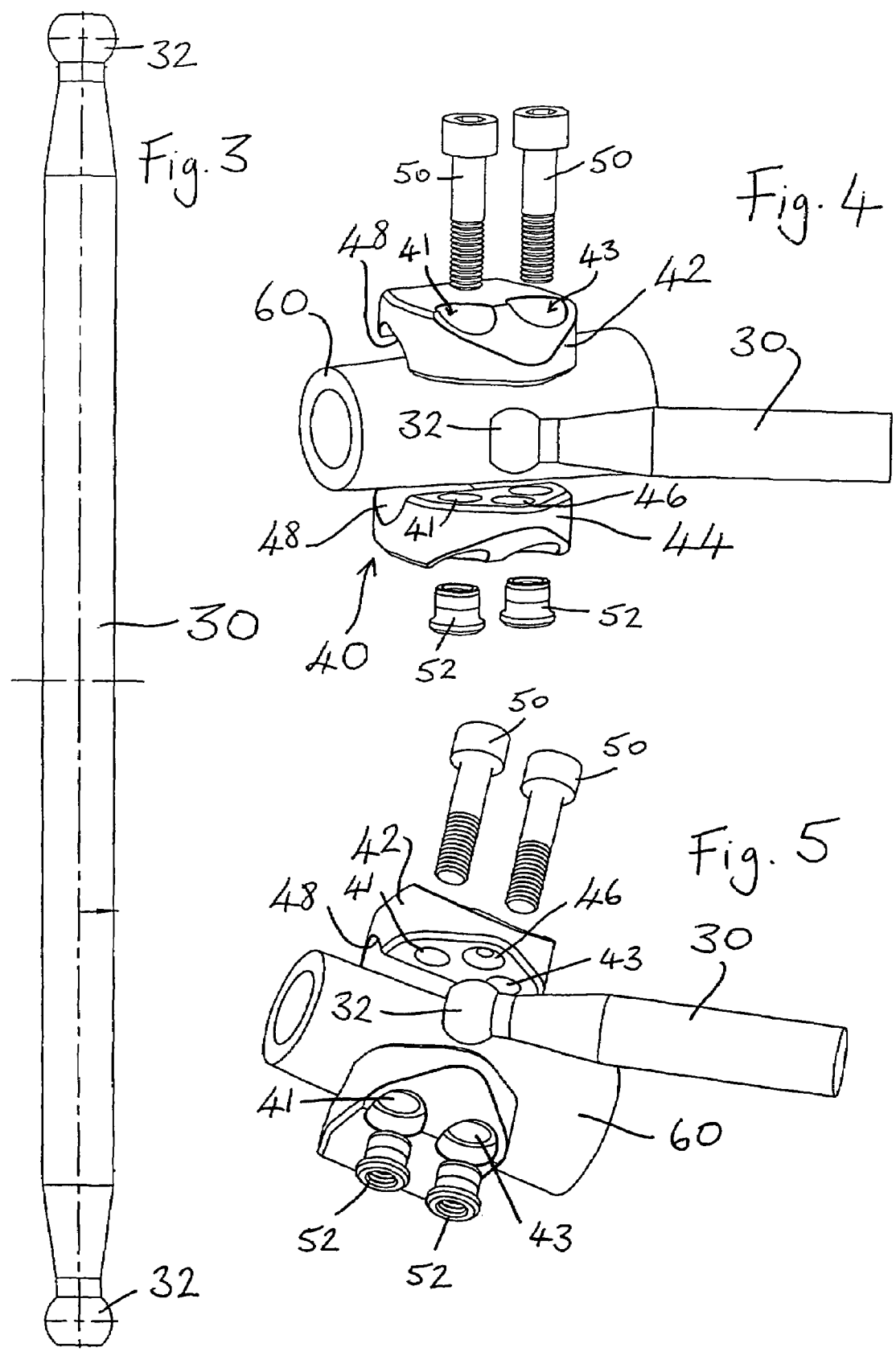

CROSSBRACE CLAMP ASSEMBLY

TECHNICAL FIELD

This invention concerns an arrangement for clamping respective ends of a crossbrace to a handlebar, particularly but not exclusively a motorcycle handlebar.

BACKGROUND ART

Cross braces in the form of metal rods are fitted to motorcycle handlebars of a particular, well known configuration involving four bends, as shown in FIG. 1. Each bar 20 has a central section 10, which in use will be clamped onto the bike at a central location, respective end sections 12, 14, which in use will be at a higher level than the central section 10 and to the ends of which hand grips and controls will be fitted, and respective intermediate or bent sections 16, 18, which extend between the central section 10 and each end section 12, 14. The bar 20 is first bent at each end of the central section 10, leading into the proximal end of the respective bent section 16, 18, and is bent again at the distal end of each bent section, leading into the respective end section 12, 14. The bar 20 is symmetrical. Such bars are invariably tubular, and of steel or aluminium, but that is not essential to the invention.

Conventional bars of this shape have a substantially constant external diameter (⅞", namely 22.23 mm).

A crossbrace 21 is fitted between the respective bent sections 16, 18, for enhanced strength and rigidity. It is attached by a clamp (22 or 24) at each end. Two forms of clamp are known for this purpose.

The older form comprises a pair of C shaped clamp elements, each having a pair of opposed connection straps, which are bolted together in a facing disposition, with a bolt at each side of the handlebar. One of these bolts also secures the end of cross brace, which is formed into a flattened tongue or lug.

Because one of the bolts and the connection straps it secures projects inconveniently for motocross cycle riders, who need to be able to turn the handlebar right into the body in some instances, the aforesaid clamp has been superseded, at least on motocross bikes and the like, by a single U-shaped clamp body (22 or 24) which partially encircles the bar. This clamp 24 is generally secured by a single bolt 26, which also secures the end of the crossbrace 21, as shown in FIG. 2, which is again formed into a flattened tongue or lug 29. Alternatively, as shown in FIG. 1, such a clamp 22 may have elongate clevis arms and be secured by two bolts 23, 25, one of which secures the clamp body 22 to the bar 20, and the other of which secures the end of the crossbrace 21 to the clamp body 22, as described in U.S. Pat. No. 5,064,157.

Motorcycle handlebars are now known, as described, for example, in U.S. Pat. No. 5,117,708, U.S. Pat. No. 5,257,552, and U.S. Pat. No. 5,950,497, which are of similar overall configuration, but wherein the external diameter of the central section is enlarged (to 1⅛", namely 28.58 mm) and the bent sections taper from their proximal ends, at or near the central section, to their distal ends, at or near the end sections, which remain at an external diameter of about ⅞" (22.23 mm). Hitherto, such handlebars have not been fitted with crossbraces. They already have enhanced strength compared to the constant but smaller external diameter bars.

It is now desired to fit crossbraces to these latter bars, but it is difficult, with the style of clamps known hitherto, to clamp a tapering frustoconical surface so that there will be no slippage and simultaneously clamp the end of a crossbrace, bearing in mind that it is also important to have a wide area of contact between the bar and the clamp to minimise the risk of uneven wear or uneven stress leading to failure of the bar, and risk to life.

OBJECTS OF THE INVENTION

An object of the present invention is to provide a crossbrace clamp assembly which is suitable for fitting to tapered handlebars as aforesaid, bearing in mind safety requirements, and which is relatively easy to fit thereto.

A further object is to provide a crossbrace clamp assembly which can be fitted to different sizes of tapered handlebars, without the need for a range of different sizes of crossbrace. In this respect most manufacturers of such handlebars provide from two to six different sizes of bars where the bent sections are of slightly differing length or inclination, to suit different statures and personal preferences of riders.

It must be stressed that although the crossbrace clamp assembly according to the invention, has been devised in order to meet the above object for tapered handlebars, it can also be used on handlebars of substantially constant external diameter.

Yet a further object of the invention is to provide a crossbrace clamp assembly which is sufficiently easy to fit and is sufficiently secure when clamped to the bar as not to require additional securement of the clamps by adhesive that it can be removed, replaced, re-fitted, or transferred between bars subsequent to original manufacture or assembly of the bar.

SUMMARY OF THE INVENTION

An assembly in accordance with the invention, which fulfils these objectives, comprises a crossbrace which is formed at each end with a part-spherical knob (or lug), two clamps, one for clamping each knob to the handlebar at spaced apart locations, in which respect each clamp comprises two opposing clamp portions, each formed with a part-spherical recess for reception therebetween of the respective crossbrace knob, with a further recess having a part-circular cross-section for reception therebetween of the handlebar location at which it is to be fitted, and with at least one aperture, and at least one fastener for each clamp, which fastener, in use, engages through the apertures in the opposing clamp portions to clamp them to both the handlebar and the cross brace knob.

In preferred embodiments in accordance with the invention each clamp portion is formed with two apertures, one adjacent each side of the part-spherical recess, and two fasteners are provided for each clamp for engagement through these two apertures in each opposing portion of each clamp so as to clamp them to both the handlebar and the crossbrace knob.

BRIEF DESCRIPTION OF THE DRAWINGS

The invention will be described further by way of example with reference to the accompanying drawings, in which:

FIG. 3 is a side view of a crossbrace, which is a component of a preferred embodiment of a crossbrace clamp assembly of the present invention;

FIG. 4 is an exploded perspective view from above showing the clamping of one end of the crossbrace of FIG. 3 to a handlebar in accordance with a preferred clamp arrangement of the invention; and FIG. 5 shows the same parts as in FIG. 4, but now viewed partially from the front.

DETAILED DESCRIPTION OF EMBODIMENTS

Figure 1:
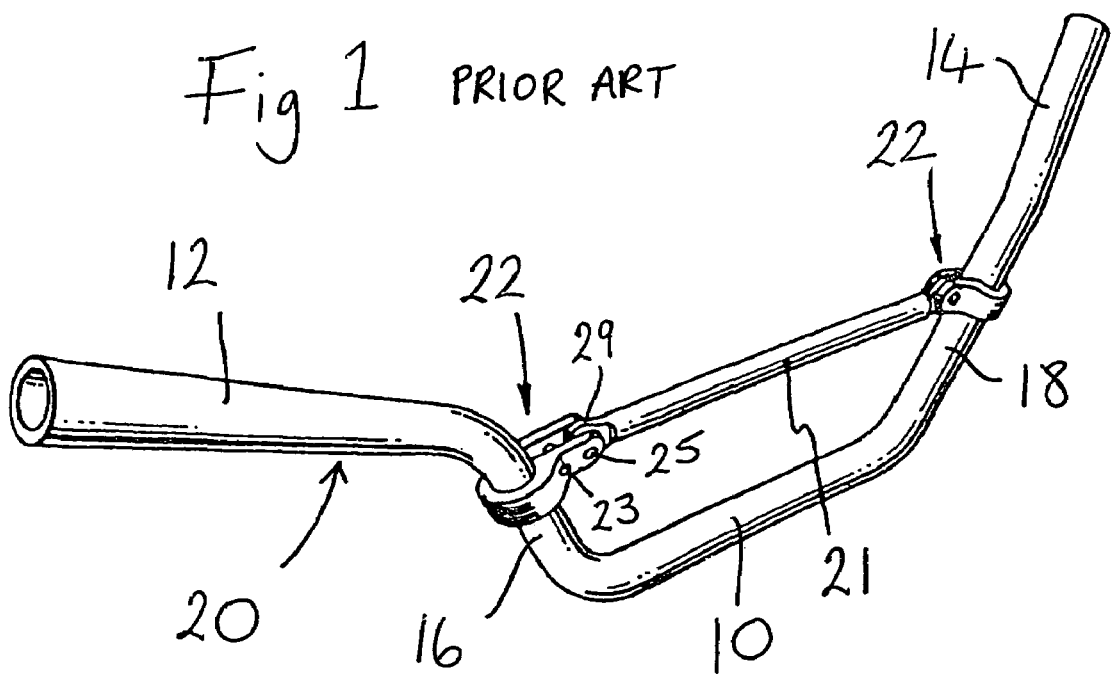
FIG. 1 is a perspective view of a known handlebar fitted with a crossbrace, as already described above.
Figure 2:
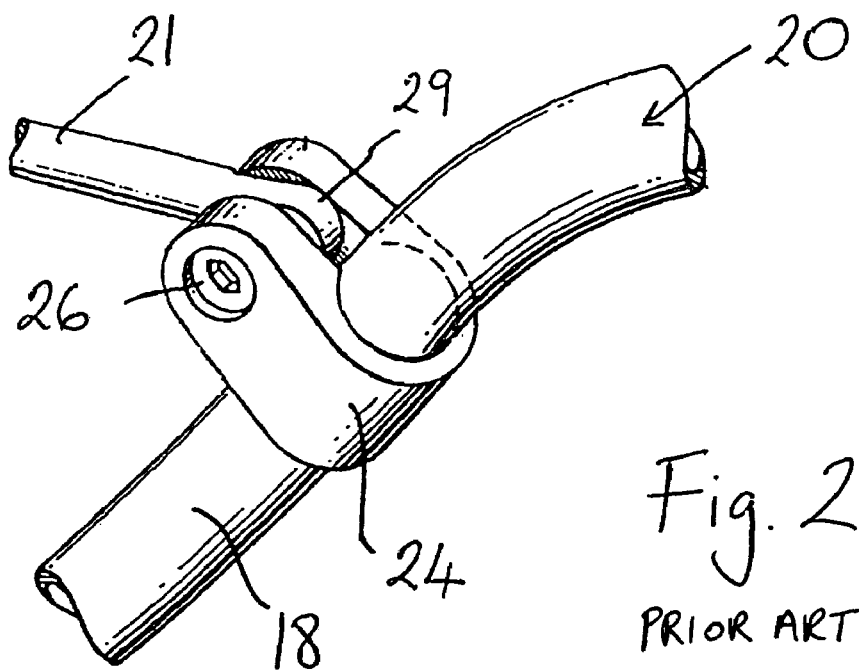
FIG. 2 is a fragmentary, enlarged scale, perspective view of a known clamp attaching a crossbrace to a handlebar, as also already described above.

Referring to FIGS. 3 to 5, a preferred practical embodiment of the crossbrace clamp assembly of the invention comprises a crossbrace 30, two clamps 40, only one of which is shown in FIGS. 4 and 5, as there is one for attaching each end of the crossbrace 30 and the other one corresponds, and respective bolts 50 and nuts 52 for securing the clamps 40.

The crossbrace 30, as shown fully in FIG. 3, comprises an aluminium rod which at each end tapers somewhat and is then formed with a terminal, part-spherical knob 32.

Each clamp 40 comprises two opposing clamp portions or jaws 42, 44. Each such jaw 42 or 44 is configured on its surface which, in use, will face the other with a part spherical recess 46 and a further recess 48 which is part-circular in cross-section. As is apparent by reference to FIGS. 4 and 5, the recesses 48 fit snugly around a handlebar 60, only a small part of which is shown, when the two jaws 42, 44 are connected together. At the same time the recesses 46 fit closely around and clamp one knob 32 of the crossbrace 30.

Each jaw 42, 44 is also formed with two apertures 41, 43, which are symmetrically located, one adjacent each side of the part-spherical recess 46. These apertures 41, 43 are to enable the clamping together of the jaws 42, 44 by means of the bolts and nuts 50, 52.

When the clamps 40 are intended for fitting to a section of handlebar 60 having a tapered external diameter, as shown in FIGS. 4 and 5, the recesses 48 will be formed with a corresponding tapering shape so as to be a close fit with a large area of contact. This is to minimise local stress and wear which could in due course lead to or contribute to failure of the bar upon impact. Thus the opposing jaws, 42, 44 may differ in the form of their apertures 41, 43, to accommodate the nuts 52 or the bolts 50 respectively, and in the shape of their recesses 48, in which respect they will be substantially mirror symmetrical. The clamp jaws for use at the other end of the crossbrace 30 may also differ in this way so there will usually be four slightly differing jaws for use on a tapered bar.

The advantage of this clamp assembly, particularly the provision of and clamping of the knobs 32 at each end of the crossbrace 30, is that it enables the crossbrace to be fitted to tapered bars with adequate tightness and maximised contact area notwithstanding the slight differences in taper which may arise between different bars in the manufacturing process.

Moreover, the same clamp jaws will fit equally well to differently sized bars, i.e. bars which are made with different inclination and length of bent sections (see 16, 18 in FIG. 1). The provision of knobs 32 ensures that any disposition can be assumed by the crossbrace, without strain, and particularly secure clamping is also ensured.

Other embodiments of the clamp assembly of the invention can be designed for use on non-tapering handlebars i.e. conventional constant external diameter handlebars or stepped diameter handlebars, as described in GB 2321225 and U.S. Pat. No. 6,182,528 and marketed by the applicants under the registered trade mark TWINWALL. In all these cases the recesses (as 48) would simply be of appropriate substantially part-cylindrical shape.

In these and other embodiments, resilient pads, e.g. of rubber, may be provided in the recesses of part-circular cross-section (as 48) between each clamp jaw and the handlebar, for purposes of vibration damping and accuracy of surface contact.

The foregoing is only illustrative of the scope of the invention and other variations in detail are possible in other embodiments. For example, instead of nuts and bolts, other fasteners could be employed and there is a possibility of employing only a single fastener per clamp.

The invention claimed is:

1. A crossbrace clamp assembly for a handlebar comprising:
   an elongate crossbrace having first and second ends and each said end being formed with a part-spherical knob;
   two clamps, one for clamping each said knob to the handlebar at spaced apart locations, in which respect each clamp includes two separate clamp elements adapted to be opposedly mounted,
   wherein each said clamp element comprises:
      a facing surface formed with a part-spherical recess and a further recess having a part-circular cross-section, the part-circular recess of each clamp element being tapered so as to form a close fit with a corresponding tapering shape of the handlebar;
      at least one aperture therethrough; and
      at least one fastener for each clamp, which fastener, in use, engages through the apertures in the opposing clamp elements of each clamp to clamp them securely to both the handlebar and the respective crossbrace knob with the respective crossbrace knob received between the part-spherical recesses of the opposedly mounted clamp elements and respective handlebar locations received between the recesses of part-circular cross-section of the opposedly mounted clamp elements of each clamp.

2. An assembly as set forth in claim 1, wherein each clamp element is formed with two apertures, each aperture being adjacent to a side of the part-spherical recess, and two fasteners are provided for each clamp for engagement through these two apertures in each opposing element of each clamp so as to clamp them to both the handlebar and the respective crossbrace knob.

3. A motorcycle handlebar fitted with a crossbrace assembly according to claim 1.

* * * * *